United States Patent
Dyavappa et al.

(10) Patent No.: US 11,074,162 B2
(45) Date of Patent: Jul. 27, 2021

(54) SYSTEM AND A METHOD FOR AUTOMATED SCRIPT GENERATION FOR APPLICATION TESTING

(71) Applicant: Cognizant Technology Solutions India Pvt. Ltd., Chennai (IN)

(72) Inventors: Pallavi Handigodu Dyavappa, Bangalore (IN); Saravana Kumar Nagamurthy, Chennai (IN); Divya Balakrishnan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 193 days.

(21) Appl. No.: 16/435,859

(22) Filed: Jun. 10, 2019

(65) Prior Publication Data
US 2020/0327043 A1    Oct. 15, 2020

(30) Foreign Application Priority Data
Apr. 15, 2019   (IN) .............................. 201941014995

(51) Int. Cl.
*G06F 11/36*    (2006.01)

(52) U.S. Cl.
CPC ...... *G06F 11/3684* (2013.01); *G06F 11/3664* (2013.01); *G06F 11/3688* (2013.01)

(58) Field of Classification Search
CPC ............. G06F 11/3684; G06F 11/3664; G06F 11/3688
See application file for complete search history.

(56) References Cited

U.S. PATENT DOCUMENTS

| 7,165,240 B2 * | 1/2007 | Patterson .............. G06F 11/368 717/116 |
| 7,174,541 B2 * | 2/2007 | Muller .................... G06F 11/36 714/E11.207 |
| 7,627,821 B2 * | 12/2009 | Klementiev ........ G06F 9/45512 715/704 |

(Continued)

FOREIGN PATENT DOCUMENTS

| CN | 101025686 A | 8/2007 |

OTHER PUBLICATIONS

CA Technologies "How to Implement In-Sprint Test Automation Practices", URL (https://www.ca.com/en/blog-agile-requirements-designer/in-sprint-test-automation-practices.html); Jun. 15, 2018.

(Continued)

*Primary Examiner* — Douglas M Slachta
(74) *Attorney, Agent, or Firm* — Cantor Colburn LLP

(57) ABSTRACT

A computer-implemented method for automated test script generation for application testing, more particularly for testing one or more functions of Application Under Test (AUT) where, in operation, a test case flow sequence is ascertained, including a data list defining one or more methods, where each method is further representative of an automation code corresponding to a manual step of the test case, and a test class for testing a function of AUT is generated using the test case flow sequence if each of the one or more methods are available in the framework, such that the disclosure provides for generating a test class for testing the function of AUT by automatically generating the one or methods if the methods are not available in the framework.

18 Claims, 3 Drawing Sheets

(56) References Cited

U.S. PATENT DOCUMENTS

| | | | | |
|---|---|---|---|---|
| 7,747,984 B2* | 6/2010 | Hsu | G06F 11/3684 | 717/124 |
| 8,160,998 B2* | 4/2012 | Abrams | G06F 16/88 | 707/602 |
| 8,185,877 B1* | 5/2012 | Colcord | G06F 11/3692 | 717/127 |
| 8,850,395 B2* | 9/2014 | Mishra | G06F 11/3696 | 717/124 |
| 8,904,355 B2* | 12/2014 | Channamsetti | G06F 11/3688 | 717/124 |
| 9,141,521 B2* | 9/2015 | Zhang | G06F 11/3684 | |
| 9,678,747 B2* | 6/2017 | Beckett | G06F 8/53 | |
| 9,697,012 B2* | 7/2017 | Schwartz | G06F 9/451 | |
| 9,710,367 B1* | 7/2017 | Nagineni | G06F 11/3684 | |
| 10,866,883 B2* | 12/2020 | Ben Shabtai | G06F 11/3688 | |
| 2008/0155514 A1* | 6/2008 | Couldwell | G06F 11/3692 | 717/135 |
| 2009/0089688 A1* | 4/2009 | Zhao | G06F 11/3684 | 715/762 |
| 2009/0217302 A1* | 8/2009 | Grechanik | G06F 11/368 | 719/320 |
| 2010/0229155 A1* | 9/2010 | Adiyapatham | G06F 11/3672 | 717/124 |
| 2011/0016453 A1* | 1/2011 | Grechanik | G06F 11/368 | 717/125 |
| 2013/0159784 A1* | 6/2013 | Rossi | G06F 11/3684 | 714/47.1 |
| 2014/0040667 A1* | 2/2014 | Zemer | G06F 11/3684 | 714/32 |
| 2016/0342501 A1 | 11/2016 | Venkatesan | | |
| 2018/0293157 A1* | 10/2018 | Dougherty | G06F 11/3688 | |
| 2019/0303269 A1* | 10/2019 | Arieli | G06F 16/958 | |

OTHER PUBLICATIONS

Ruifeng Chen, Huaikou Miao, "A Selenium based approach to automatic test script generation for refactoring JavaScript code", URL: (https://ieeexplore.ieee.org/document/6607864) Jun. 16-20, 2013.

* cited by examiner

SYSTEM AND A METHOD FOR AUTOMATED SCRIPT GENERATION FOR APPLICATION TESTING

CROSS REFERENCE TO RELATED APPLICATION

This application is related to and claims the benefit of Indian Patent Application Number 201941014995 filed on Apr. 15, 2019, the contents of which are herein incorporated by reference in their entirety.

FIELD OF THE INVENTION

The present invention relates generally to the field of quality assurance and application testing. More particularly, the present invention relates to a system and a method for automated test case script generation for testing one or more functions of application under test.

BACKGROUND OF THE INVENTION

Functional testing has been used over the years as a tool for assessing functional performance of each feature of various applications under development. In particular, such testing is conducted to assess errors, flaws, bugs, etc. in one or more functions performed by the application code. One or more testing techniques may be selected based on the size and complexity of the application code. Existing techniques include using a testing framework to control the execution of the application being tested.

Testing frameworks provides a standardized set of test commands, methods, libraries and configurations to design and program tests to be run on the application under test. Said test commands and methods are assembled into a larger test case script which is run and monitored by the testing framework. However, designing, writing, and implementing a test case script, even with the aid of the pre-written test commands of a testing framework is labor intensive and error prone. The existing technique of test case script generation is predominantly a manual, error-prone process often resulting in high rework and maintenance efforts. In particular, existing techniques require a user to manually input one or more steps of a test case such as action, object and test data in an external file. Further, setting of the test commands to convert the action associated with test case to actual test case script requires manual effort. Furthermore, testing of newly added features requires re-writing of the entire test case script. In particular, unique identifiers associated with one or more pages of the application under test are identified manually as the unique identifiers are dynamic and nested. The unique identifiers are manually identified based on actions such as button clicks, typing text values etc. Yet further, in some instances, the time required to create test case scripts may be equal or exceed the time it takes to test the application under test. Yet further, the existing testing techniques require one or more testers to have technical expertise of a particular domain to write, edit and execute scripts, which in turn restricts automated testing for non-technical testers.

In light of the above drawbacks, there is a need for a system and a computer-implemented method for automated test case script generation for testing one or more functions of application under test (AUT). There is a need for a system and a computer-implemented method which accelerates script generation by automatically identifying objects associated with an application under test. Further, there is a need for a system and computer-implemented method which utilizes methods pre-existing in the testing framework and automatically generates methods for new features of AUT to automate test case script generation. Furthermore, there is a need for a system and a computer-implemented method which automates identification of unique identifiers associated with one or more pages of AUT. Yet further, there is a need for a system and computer-implemented method which generates test scripts aligned with the testing framework. Yet further, there is a need for a system and a computer-implemented method which eliminates the need for a tester to have any technical expertise to generate test scripts. Yet further, there is a need for a system and a computer-implemented method which is inexpensive and can be easily integrated with any standard testing frameworks. Yet further, there is a need for a system and a method which facilitates in-sprint automation.

SUMMARY OF THE INVENTION

In various embodiments of the present invention, a computer-implemented method for automated test case script generation for application testing is provided. The method is implemented by at least one processor executing program instructions stored in a memory, the method comprises ascertaining a test case flow sequence based on data received via a terminal device. The test case flow sequence includes a data list defining one or more methods. Each method is representative of an automation code corresponding to manual steps of the test case flow sequence. The method further comprises determining an availability of the one or more methods associated with the test case flow sequence in a testing framework. Further, the method comprises generating a test class based on the availability of the one or more methods in the testing framework. The test class is an ordered sequence of the one or more methods, where the generated test class is representative of an automated test case script for automated application testing. The test class is generated for the ascertained test case flow sequence if each of the one or more methods are available in the testing framework. Furthermore, the method comprises generating the test class by generating the one or more methods associated with the test case flow sequence using a first set of rules if the one or more methods are unavailable in the testing framework.

In various embodiments of the present invention, a system for automated test case script generation for application testing is provided. The system comprises a memory storing program instructions, a processor configured to execute program instructions stored in the memory, and a script generation engine in communication with the processor. The system is configured to ascertain a test case flow sequence based on data received via a terminal device. The test case flow sequence includes a data list defining one or more methods, each method is representative of an automation code corresponding to manual steps of the test case flow sequence. Further, the system is configured to determine an availability of the one or more methods associated with the test case flow sequence in a testing framework. Furthermore, the system is configured to generate a test class based on the availability of the one or more methods in the testing framework. The test class is an ordered sequence of the one or more methods, where the generated test class is representative of an automated test case script for automated application testing. Yet further, the system id configured to generate the test class for the ascertained test case flow sequence if each of the one or more methods are available in the testing framework. Finally, the system is configured to generate the test class by generating the one or more methods associated with the test case flow sequence using a first set of rules if the one or more methods are unavailable in the testing framework.

In various embodiments of the present invention, a computer program product is provided. The computer program product comprises a non-transitory computer-readable medium having computer-readable program code stored thereon, the computer-readable program code comprising instructions that, when executed by a processor, cause the processor to ascertain a test case flow sequence based on data received via a terminal device. The test case flow sequence includes a data list defining one or more methods, each method is representative of an automation code corresponding to manual steps of the test case flow sequence. Further, an availability of the one or more methods associated with the test case flow sequence in a testing framework is determined. Furthermore, a test class is generated based on the availability of the one or more methods in the testing framework. The test class is an ordered sequence of the one or more methods, where the generated test class is representative of an automated test case script for automated application testing. Yet further, the test class is generated for the ascertained test case flow sequence if each of the one or more methods are available in the testing framework. Finally, the test class is generated by further generating the one or more methods associated with the test case flow sequence using a first set of rules if the one or more methods are unavailable in the testing framework.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a computer-implemented method for automated test script generation for application testing. In particular, the present invention provides for a system and a computer-implemented method for automated test script generation for testing one or more functions of Application Under Test (AUT). In operation, the present invention provides for ascertaining a test case flow sequence based on a selection of one or more methods. The test case flow sequence includes a data list defining one or more methods, where each method is further representative of an automation code corresponding to a manual step of the test case. Further, the present invention provides for generating a test class for testing a function of AUT using the test case flow sequence based on determination of an availability of one or more methods in the framework. The test class is an ordered sequence of the one or more methods associated with the test case flow sequence and is representative of an automated test case script for testing a function of AUT. The present invention further, provides for generating one or methods if said methods are not available in the framework. Finally, the present invention provides for generating a test class for testing the function of AUT using the generated methods and the existing methods.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
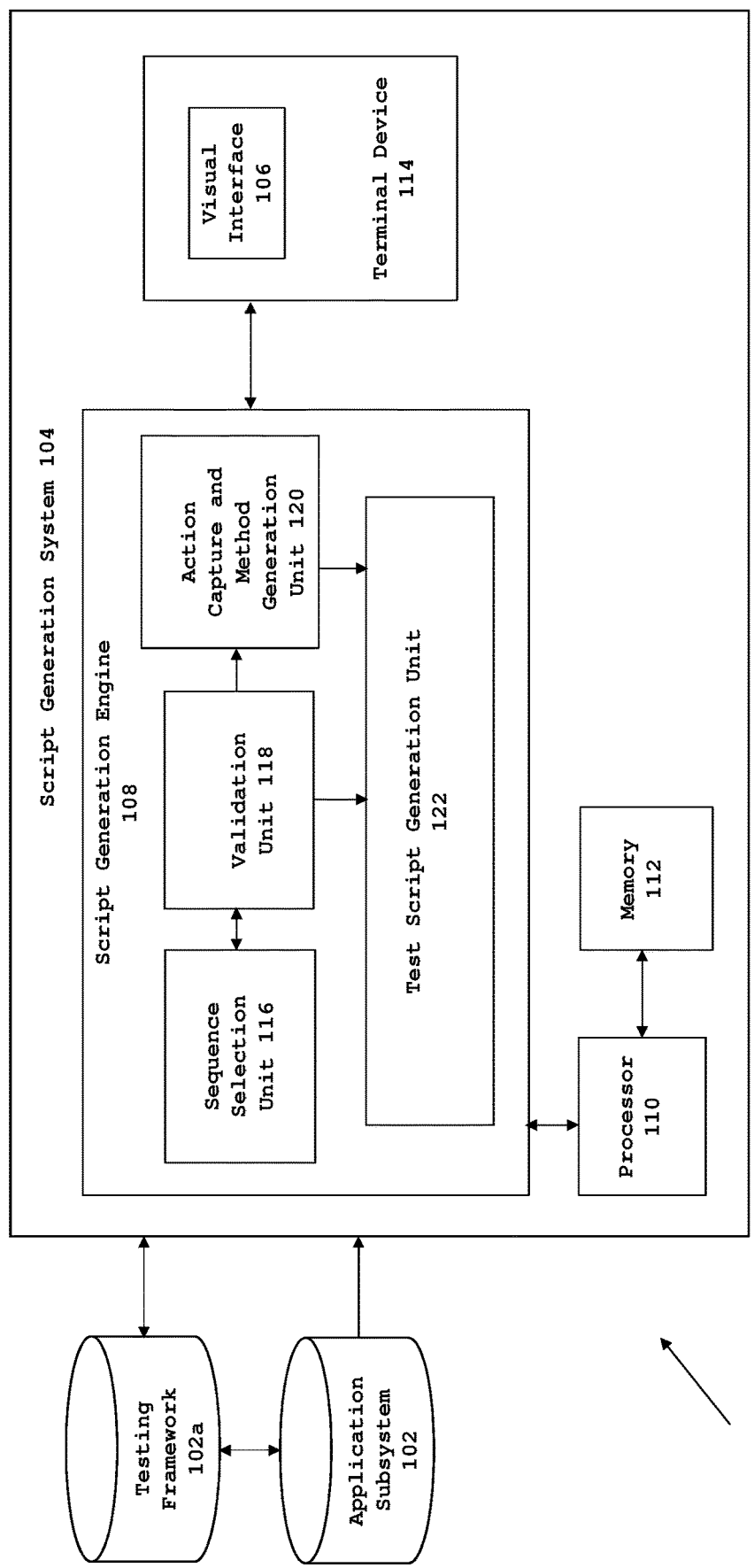
FIG. 1 illustrates a detailed block diagram of a system for automated test case script generation for application testing, in accordance with an embodiment of the present invention.

FIG. 1 illustrates a detailed block diagram of a system for automated test case script generation for application testing, in accordance with an embodiment of the present invention. Referring to FIG. 1, in an embodiment of the present invention, illustrated is a testing environment 100 which comprises an application subsystem 102, a testing framework 102a and the system for automated test case script generation hereinafter referred to as a script generation system 104.

In an embodiment of the present invention, the application subsystem 102 may be a hardware device. In another embodiment of the present invention, the application subsystem 102 may be a software device or a combination of hardware and software. In an embodiment of the present invention, the application subsystem 102 comprises a software application which is subject to testing, hereinafter referred to as application under test (AUT). In an exemplary embodiment of the present invention, where the application subsystem 102 is a combination of hardware and software, the application subsystem 102 comprises a memory (not shown) to store the application under test and a processor (not shown) to execute instructions stored in the memory (not shown). In an exemplary embodiment of the present invention, the application subsystem 102 is a server. The application under test (AUT) may be written in any of the programming languages such as C, C++, Java etc. and is configured to perform one or more functions. The application under test (AUT) comprises a graphical user interface (not shown) having one or more pages to facilitate a user to interact with the application under test. Further, each page comprises one or more page objects. Examples of page objects may include, but are not limited to, text box, links, buttons, tables, field locators etc. Each page object includes one or more unique identifiers. Further each page object is associated with one or more page elements. Each page element is further associated with one or more element attributes which form the respective page elements. Examples of element attributes may include, but are not limited to ID, class name, text, values, CSS and Xpath. In an exemplary embodiment of the present invention, as shown in FIG. 1, the application under test is a web application hosted by the application subsystem 102. As explained in the above paragraph, the web application comprises one or more pages further comprising page objects.

In an embodiment of the present invention, the testing framework 102a may be implemented in a computer, a microprocessor, or any other device capable of executing instructions. The testing framework interfaces with application subsystem 102 over a software interface. In an exemplary embodiment of the present invention, the testing framework 102a is integrated with the application subsystem 102. In an embodiment of the present invention, the testing framework 102a may include, but is not limited to, guidelines, coding standards, concepts, processes, practices, project hierarchies, modularity, method code template, test case script templates, libraries, class files, one or more methods, page objects and test data to pillar automation testing. The method code template and test case script template contains an outline of method code and test case script as a guideline for generating new method codes and test case scripts. In an embodiment of the present invention, the testing framework 102a may be an industry standard framework. In another embodiment of the present invention, the testing framework 102a is developed specifically for the application under test (AUT). In an exemplary embodiment of the present invention, the testing framework 102a may be developed using any of the programming languages such as Java, C# etc.

In various embodiments of the present invention, the script generation system 104 may be a hardware, a software or a combination of hardware and software. In an exemplary embodiment of the present invention, the script generation system 104 is implemented as a software executable file. In an embodiment of the present invention, as shown in FIG. 1, the script generation system 104 interfaces with the application subsystem 102 and the testing framework 102a. In an exemplary embodiment of the present invention, the script generation system 104 and the testing framework 102a may be implemented as a single unit, where the script generation system 104 may interface with the testing framework 102a via a software interface. In another exemplary embodiment of the present invention, the script generation system 104 may be a hardware or a combination of hardware and software, and interfaces with the testing framework 102a and the application subsystem 102 over a communication channel (not shown). The communication channel (not shown) may include interface such as a software interface, physical transmission medium, such as, a wire, or a logical connection over a multiplexed medium, such as, a radio channel in telecommunications and computer networking. Examples of radio channel in telecommunications and computer networking may include, but are not limited to RFID, Bluetooth, a Local Area Network (LAN), a Metropolitan Area Network (MAN), and a Wide Area Network (WAN).

In another embodiment of the present invention, the script generation system 104 may be implemented in a cloud computing architecture in which data, applications, services, and other resources are stored and delivered through shared data-centers. In an exemplary embodiment of the present invention, the functionalities of the script generation system 104 are delivered to a tester as software as a service (SAAS).

In various embodiments of the present invention, the script generation system 104 comprises a visual interface 106, a script generation engine 108, a processor 110 and a memory 112. In various embodiments of the present invention, the visual interface 106 is a graphical user interface which allows user interaction with the script generation system 104 to test one or more functions of the application under test (AUT). In an exemplary embodiment of the present invention, the visual interface 106 is implemented via a terminal device 114. In various embodiments of the present invention, the terminal device 114 may include, but is not limited to, a touchscreen display device, a display with mouse or any other wired or wireless device capable of receiving inputs and displaying outputted results. In an exemplary embodiment of the present invention, the visual interface 106 is configured with graphical icons and a cursor to, select of one or more methods, perform method transactions on AUT to generate new method codes, select one or more scripts, and edit scripts. In an exemplary embodiment of the present invention, a method transaction is representative of one or more user actions associated with corresponding manual step of the test case flow sequence. Further, the visual interface 106 includes a web interface for loading web applications. In an exemplary embodiment of the present invention, the visual interface is built using Java FX web view browser.

In various embodiments of the present invention, the script generation engine 108 is configured to analyze the testing framework 102a associated with the application under test and retrieve one or more methods pre-existing in the testing framework 102a. Further, the script generation engine 108 is configured to ascertain a test flow sequence and generate a test class based on the availability of one of more methods. The script generation engine 108 is further configured to generate one or more methods unavailable in the testing framework 102a by capturing one or more page objects and further generate one or more test classes using the generated one or more methods. Yet further, the script generation engine 108 is configured to generate one or more page classes from the captured page objects.

In various embodiments of the present invention, the script generation engine 108 has multiple units which work in conjunction with each other for automated test case script generation for application testing. The various units of the script generation engine 108 are operated via the processor 110 specifically programmed to execute instructions stored in the memory 112 for executing respective functionalities of the multiple units in accordance with various embodiments of the present invention. In an embodiment of the present invention, the script generation engine 108 comprises a sequence selection unit 116, a validation unit 118, an action capture and method generation unit 120 and a test script generation unit 122.

In an embodiment of the present invention, the sequence selection unit 116 is configured to ascertain a test case flow sequence. The test case flow sequence includes a data list defining one or more methods, where each method is representative of an automation code corresponding to a manual step of the test case. In operation, the sequence selection unit 116 ascertains a test case flow sequence based on data received from a user via the terminal device 114. In an embodiment of the present invention, the data includes one or more keywords selected for each of the one or more methods corresponding to manual steps of the test case flow. In an exemplary embodiment of the present invention, the keywords are selected by the user via the visual interface 106 of the terminal device 114.

The validation unit 118, receives the ascertained test case flow sequence from the sequence selection unit 116. In an embodiment of the present invention, the validation unit 118 is configured to perform a check to determine the availability of the one or more methods associated with the test case flow sequence in the testing framework 102a. In particular, the validation unit 118 analyzes the testing framework 102a associated with the application under test. In an embodiment of the present invention, analysis of testing framework includes scanning a plurality of folders in the testing framework root folder path using a file path of the testing framework. The analysis further includes, identifying folders and files associated with page objects, test class and test data. The validation unit 118 retrieves one or more class files from the testing framework 102*a* and extracts one or more pre-existing methods associated with respective one or more classes using a disassembler. In an exemplary embodiment of the present invention, the validation unit 118 retrieves all class files from the testing framework 102*a* and extracts all pre-existing methods associated with respective one or more classes using a disassembler. In an exemplary embodiment of the present invention, the validation unit 118 uses a Java Class File Disassembler (javap) to extract one or more pre-existing methods from class files if the testing framework 102*a* is Java based. In another exemplary embodiment of the present invention, the validation unit 118 uses an Intermediate Language Disassembler (ILDASM) to extract one or more pre-existing methods from respective class files if the testing framework 102*a* is C# based. The validation unit 118 is configured to trigger the test script generation unit 122 to generate a test class for the defined test case flow sequence if all the methods associated with the said test case flow sequence are available in the testing framework 102*a*. The test class is an ordered sequence of methods and is representative of a test case script for automated testing of a function of AUT. The test script generation unit 122 is explained in detail later in the specification. Further, the validation unit 118 is configured to trigger the action capture and method generation unit 120 for generating one or more new methods if said methods associated with the test case flow sequence are not available in the testing framework 102*a*.

In an embodiment of the present invention, the action capture and method generation unit 120 is configured to generate one or more new methods unavailable in the testing framework 102*a* using a first set of rules. In an exemplary embodiment of the present invention, the first set of rules comprises identifying unique identifiers associated with respective one or more page objects of AUT during a method transaction. In an exemplary embodiment of the present invention, a method transaction is representative of one or more actions associated with the corresponding manual steps of the test case flow sequence. In an exemplary embodiment of the present invention, the actions are performed via the visual interface 106. In an embodiment of the present invention, the action capture and method generation unit 120 is configured to identify the one or more unique identifiers associated with respective one or more page objects of the AUT during the method transaction. In operation, the action capture and method generation unit 120 captures cursor coordinates and test data associated with one or more method transactions performed via the visual interface 106 by a user. Further, the action capture and method generation unit 120 identifies one or more page elements associated with one or more page objects based on the captured cursor coordinates. Yet further, the action capture and method generation unit 120 identifies the one or more unique identifiers associated with respective one or more page objects based on the identified one or more page elements using at least one of: a single attribute technique, a multiple attribute technique and a parent element attribute technique. In an exemplary embodiment of the present invention, each unique identifier points towards respective page object. In an exemplary embodiment of the present invention, the selection of at least one of: the single attribute technique, the multiple attribute technique and the parent element attribute technique is based on the element attributes of the identified one or more page elements. The single attribute technique is selected to identify one or more unique identifiers using a single attribute of the identified page element. The multiple attribute technique is selected to identify one or more unique identifiers using multiple attributes associated with the page element if the single attribute technique fails. Further, the parent element attribute technique is selected to identify the one or more unique identifiers using a parent page element if the multiple attribute technique fails.

Further, the first set of rules include generating a code for the one or more method transactions using the identified unique identifiers and the method code templates extracted from the testing framework 102*a*. In particular, the action capture and method generation unit 120 suitably embeds the unique identifiers associated with the respective page objects in the method code template to generate the method unavailable in the testing framework 102*a*. The generated one or more new methods are transmitted to the testing framework 102*a* for future use. An example illustrating the first set of rules is explained below. In said example the application under test (AUT) is a web application for online shopping. The new method to be generated pertains to searching of an item on various pages of the web application. The step of searching for the item is representative of a method transaction. The action capture and method generation unit 120 is configured to capture the cursor coordinates during the search of item performed via the visual interface 106 by a user. The cursor coordinates may include, but are not limited to scrolling to various page objects, pointing the cursor, clicking etc. The action capture and method generation unit 120 identifies one or more page objects based on the captured cursor coordinates. In the example the page object may include, but is not limited to, a search box and other similar objects. Further the action capture and method generation unit 120 identifies unique identifiers associated with respective one or more page objects, where each unique identifier is an attribute which points towards respective page object. The action capture and method generation unit 120 generates a code for the one or more method transactions using the identified unique identifiers and the method code templates extracted from the testing framework 102*a*. The generated code is representative of method unavailable in the testing framework 102*a*. Advantageously, the action capture and method generation unit 120, automatically identifies the unique identifiers by analysing the entire page on which the method transaction is performed, and extracts nested properties values.

In an embodiment of the present invention, the action capture and method generation unit 120 is configured to extract test data used during method transactions. In particular, the action capture and method generation unit 120 retrieves text field data from keys entered via the terminal device 114 by the user. The action capture and method generation unit 120 stores the extracted test data for externalization.

In an embodiment of the present invention, the test script generation unit 122 is configured to generate the test class. The test class is an ordered sequence of the one or more methods associated with the test case flow sequence and is representative of an automated test case script for testing a function of AUT. In particular, the ordered sequence of methods enable testing of a function of AUT. The test script generation unit 122 is configured to generate the test class for the ascertained test case flow sequence using at least one of: the one or more pre-existing methods available in the testing framework and the one or more newly generated methods based on the availability of one or more methods associated with the test case flow sequence in the testing framework. The test script generation unit 122 is configured to generate the test class for the ascertained test case flow sequence on receiving a request from the sequence selection unit 116 if all the methods associated with the said test case flow sequence are available in the testing framework 102a. Further, the test script generation unit 122, is configured to generate the test class on receiving the one or more newly generated methods from the action capture and method generation unit 120. In particular, the test script generation unit 122, is configured to extract the test case script template from the testing framework 102a and align the one or more methods in an ordered sequence using the template structure.

Figure 2:
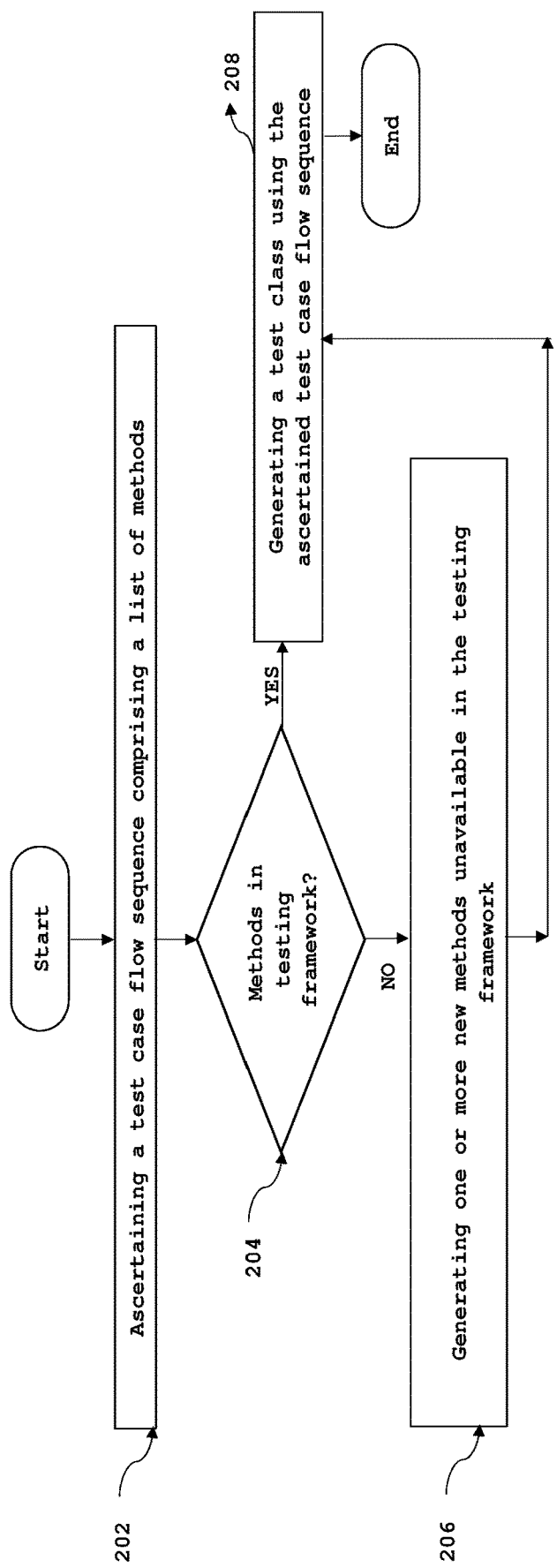
FIG. 2 is a flowchart illustrating a computer-implemented method for automated test case script generation for application testing, in accordance with various embodiment of the present invention.

FIG. 2 is a flowchart illustrating a computer-implemented method for automated test case script generation for application testing, in accordance with various embodiments of the present invention.

At step 202, a test case flow sequence is ascertained. In an embodiment of the present invention, the test case flow sequence includes a data list defining one or more methods, where each method is further representative of an automation code corresponding to manual step of the test case. In operation, in an embodiment of the present invention, a test case flow sequence is ascertained based on data received from a user via a terminal device. In an embodiment of the present invention, the data includes one or more keywords selected for each of the one or more methods corresponding to manual steps of the test case flow. In an exemplary embodiment of the present invention, the keywords are selected by the user via a visual interface of the terminal device.

At step 204, a check is performed to determine the availability of the one or more methods associated with test case flow sequence in a testing framework. In an embodiment of the present invention, the testing framework associated with the application under test is analyzed. In an embodiment of the present invention, analysis of testing framework includes scanning a plurality of folders in the testing framework root folder path using a file path of the testing framework. The analysis further includes, identifying folders and files associated with page objects, test class and test data. One or more class files are retrieved from the testing framework and one or more pre-existing methods associated with respective one or more classes are extracted using a disassembler. In an exemplary embodiment of the present invention, all class files are retrieved from the testing framework and all pre-existing methods associated with respective one or more classes are extracted using a disassembler. In an exemplary embodiment of the present invention, a Java Class File Disassembler (javap) is used to extract one or more pre-existing methods from class files if the testing framework is Java based. In another exemplary embodiment of the present invention, an Intermediate Language Disassembler (ILDASM) is used to extract one or more pre-existing methods from respective class files if the testing framework is C# based.

At step 206, one or more methods unavailable in the testing framework are generated. In an embodiment of the present invention, the one or more methods unavailable in the testing framework are generated using a first set of rules based on determination of availability. In an exemplary embodiment of the present invention, the first set of rules comprises identifying one or more unique identifiers associated with respective one or more page objects of AUT associated with a method transaction. Each unique identifier is an attribute which points towards respective page object. In an exemplary embodiment of the present invention, each method transaction is representative of one or more actions associated with corresponding manual steps of the test case flow sequence. The actions may be performed via the visual interface. In an embodiment of the present invention, identifying one or more unique identifiers associated with respective one or more page objects of the method transaction includes capturing cursor coordinates and test data fields associated with one or more method transactions performed by via the visual interface by a user. Further, one or more page elements associated with one or more page objects are identified based on the captured cursor coordinates. Yet further, the one or more unique identifiers associated with respective one or more page objects are identified based on the identified one or more page elements using at least one of: a single attribute technique, a multiple attribute technique and a parent element attribute technique. In an exemplary embodiment of the present invention, the selection of at least one of: the single attribute technique, the multiple attribute technique and the parent element attribute technique is based on the element attributes of the identified one or more page elements. The single attribute technique is selected to identify one or more unique identifiers using a single attribute of the identified page element. The multiple attribute technique is selected to identify one or more unique identifiers using multiple attributes associated with the page element if the single attribute technique fails. Further, the parent element attribute technique is selected to identify the one or more unique identifiers using a parent page element if the multiple attribute technique fails.

Further, the first set of rules include generating a code for the one or more method transactions using the identified unique identifiers and the method code templates extracted from the testing framework. In particular, the unique identifiers associated with the respective page objects are suitably embedded in a method code template retrieved from the testing framework to generate the method unavailable in the testing framework. An example illustrating the first set of rules is explained below. In said example the application under test (AUT) is a web application for online shopping and a new method to be generated pertains to searching of an item on various pages of the web application. The step of searching for the item is representative of a method transaction. The cursor coordinates during the searching of item via the visual interface by a user are captured. The cursor coordinates may include, but are not limited to scrolling to various page objects, pointing the cursor, clicking etc. The one or more page objects are identified based on the captured cursor coordinates. In the example the page object may include, but is not limited to a search box and other similar objects. Further, unique identifiers associated with respective one or more page objects are identified, where each unique identifier is an attribute which points towards respective page object. A code for the one or more method transactions is generated using the identified unique identifiers and the method code templates extracted from the testing framework. The generated code is representative of method unavailable in the testing framework 102a.

At step 208, a test class for the ascertained test case flow sequence is generated. In an embodiment of the present invention, the test class is an ordered sequence of the one or more methods associated with the test case flow sequence and is representative of an automated test case script for testing a function of AUT. The test class is generated for the ascertained test case flow sequence using at least one of: the one or more pre-existing methods available in the testing framework and the one or more newly generated methods based on the availability of one or more methods associated with the test case flow sequence in the testing framework. In particular, a test case script template is extracted from the testing framework and the one or more pre-existing methods and new methods are aligned in an ordered sequence using the template structure to generate a test class. Further, the test class is generated for the ascertained test case flow sequence using the pre-existing methods if each of the one or more methods of the test case flow sequence are available in the testing framework.

Figure 3:
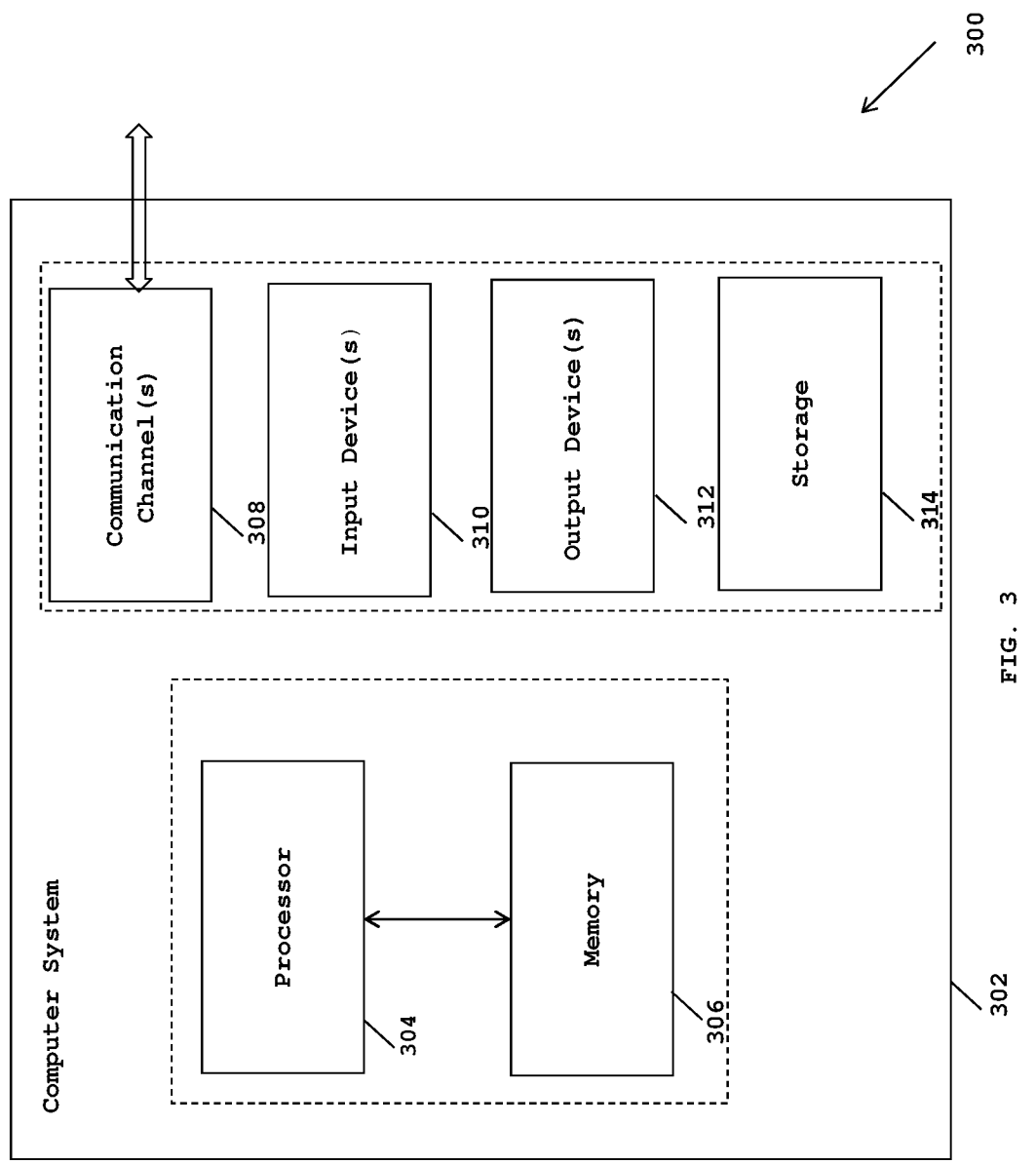
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A computer-implemented method for automated test case script generation for application testing, wherein the method is implemented by at least one processor executing program instructions stored in a memory, the method comprising:

ascertaining, by the processor, a test case flow sequence based on data received via a terminal device, wherein the test case flow sequence includes a data list defining one or more methods, each of the methods is representative of an automation code corresponding to manual steps of the test case flow sequence;

determining, by the processor, an availability of the one or more methods associated with the test case flow sequence in a testing framework;

identifying one or more unique identifiers associated with one or more page objects of an application under test during a method transaction associated with an unavailable method, wherein the unique identifiers are identified based on a single attribute technique that involves a single attribute associated with an identified page element of the page objects, and in the event the single attribute technique fails the unique identifiers are identified based on a multiple attribute technique that involves multiple attributes associated with the identified page element, and further in the event the multiple attribute technique fails the unique identifiers are identified based on a parent element attribute that involves a parent page element associated with the identified page element; and generating, by the processor, a test class, wherein the test class is an ordered sequence of the one or more methods and wherein the generated test class is representative of an automated test case script for automated application testing.

2. The method as claimed in claim 1, wherein the one or more methods associated with the test case flow sequence are generated using a first set of rules if the one or more methods are unavailable in the testing framework, wherein the first set of rules comprises:
   generating a code for performing the method transaction using the identified unique identifiers and a method code template extracted from the testing framework, wherein the method transaction is representative of actions associated with the corresponding manual steps of the test case flow sequence, further wherein each of the unique identifiers is an attribute which points towards a respective page object, and wherein where the code is representative of the unavailable method; and
   repeating the step of identification and generation for each unavailable method.

3. The method as claimed in claim 2, wherein identifying the one or more unique identifiers include capturing cursor coordinates and test data fields associated with the method transaction performed via a visual interface; and identifying the one or more page elements associated with the one or more page objects based on the captured cursor coordinates.

4. The method as claimed in claim 2, wherein the test class is generated using at least the one or more generated methods based on the availability of the one or more methods associated with the test case flow sequence in the testing framework.

5. The method as claimed in claim 4, wherein generating the test class includes aligning the one or more methods available in the testing framework and one or more generated methods in an ordered sequence using a test case script template extracted from the testing framework.

6. The method as claimed in claim 1, wherein generating the test class includes aligning each of the one or more methods in an ordered sequence using a test case script template extracted from the testing framework.

7. The method as claimed in claim 1, wherein determining the availability of the one or more methods in the testing framework includes retrieving one or more class files of the testing framework and extracting one or more methods associated with the one or more class files using a disassembler.

8. A system for automated test case script generation for application testing, the system comprising:
   a memory storing program instructions; a processor configured to execute program instructions stored in the memory; and a script generation engine in communication with the processor and configured to:
   ascertain a test case flow sequence based on data received via a terminal device, wherein the test case flow sequence includes a data list defining one or more methods, each of the methods is representative of an automation code corresponding to manual steps of the test case flow sequence;
   determine an availability of the one or more methods associated with the test case flow sequence in a testing framework and identify one or more unique identifiers associated with one or more page objects of an application under test during a method transaction associated with an unavailable method, wherein the unique identifiers are identified based on a single attribute technique that involves a single attribute associated with an identified page element of the page objects, and in the event the single attribute technique fails the unique identifiers are identified based on a multiple attribute technique that involves multiple attributes associated with the identified page element, and further in the event the multiple attribute technique fails the unique identifiers are identified based on a parent element attribute that involves a parent page element associated with the identified page element; and
   generate a test class, wherein the test class is an ordered sequence of the one or more methods and wherein the generated test class is representative of an automated test case script for automated application testing.

9. The system as claimed in claim 8, wherein the script generation engine comprises a sequence selection unit in communication with the processor, said sequence selection unit is configured to ascertain the test case flow sequence using a first set of rules, wherein the first set of rules include selectively naming the one of more methods corresponding to manual steps of the test case flow sequence via a visual interface.

10. The system as claimed in claim 8, wherein the script generation engine comprises a validation unit in communication with the processor, said validation unit is configured to determine the availability of the one or more methods associated with the test case flow sequence in the testing framework by analyzing the testing framework and retrieving one or more class files of the testing framework and extracting one or more methods associated with the one or more class files using a disassembler.

11. The system as claimed in claim 8, wherein the one or more methods associated with the test case flow sequence are generated using a first set of rules if the said one or more methods are unavailable in the testing framework.

12. The system as claimed in claim 8, wherein the script generation engine comprises an action capture and method generation unit in communication with the processor, said action capture and method generation unit is configured to generate the unavailable method using a first set of rules, wherein the first set of rules comprises:
   generating a code for performing the method transaction using the identified unique identifiers and a method code template extracted from the testing framework, wherein the method transaction is representative of actions associated with the corresponding manual steps of the test case flow sequence, further wherein each unique identifier is an attribute which points towards respective page object, and where wherein the code is representative of the unavailable method.

13. The system as claimed in claim 12, wherein identifying the one or more unique identifiers includes capturing cursor coordinates and test data fields associated with the method transaction performed via a visual interface; and identifying the one or more page elements associated with the one or more page objects based on the captured cursor coordinates.

14. The system as claimed in claim 8, wherein the script generation engine comprises a test script generation unit in communication with the processor, said test script generation unit is configured to generate the test class if each of the one or more methods associated with the test case flow sequence are available in the testing framework, further wherein test script generation unit is configured to generate the test class by aligning each of the one or more methods in an ordered sequence using a test case script template extracted from the testing framework.

15. The system as claimed in claim 12, wherein the script generation engine comprises a test script generation unit in communication with the processor, said test script generation unit is configured to generate the test class by aligning the one or more generated methods in an ordered sequence using a test case script template extracted from the testing framework, if no method associated with the test case flow sequence available in the testing framework.

16. The system as claimed in claim 12, wherein the test class is generated using at least the one or more generated methods based on the availability of the one or more methods associated with the test case flow sequence in the testing framework.

17. A computer program product comprising:
a non-transitory computer-readable medium having computer-readable program code stored thereon, the computer-readable program code comprising instructions that, when executed by a processor, cause the processor to:
ascertain a test case flow sequence based on data received via a terminal device, wherein the test case flow sequence includes a data list defining one or more methods, each of the methods is representative of an automation code corresponding to manual steps of the test case flow sequence;
determine an availability of the one or more methods associated with the test case flow sequence in a testing framework and identify one or more unique identifiers associated with one or more page objects of an application under test during a method transaction associated with an unavailable method, wherein the unique identifiers are identified based on a single attribute technique that involves a single attribute associated with an identified page element of the page objects, and in the event the single attribute technique fails the unique identifiers are identified based on a multiple attribute technique that involves multiple attributes associated with the identified page element, and further in the event the multiple attribute technique fails the unique identifiers are identified based on a parent element attribute that involves a parent page element associated with the identified page element; and
generate a test class, wherein the test class is an ordered sequence of the one or more methods and wherein the generated test class is representative of an automated test case script for automated application testing.

18. The computer program product as claimed in claim 17, wherein generating the test class comprises generating the one or more methods associated with the test case flow sequence using a first set of rules if the one or more methods are unavailable in the testing framework, wherein the first set of rules comprises:
generating a code for performing the method transaction using the identified unique identifiers and a method code template extracted from the testing framework, wherein the method transaction is representative of actions associated with the corresponding manual steps of the test case flow sequence, further wherein each unique identifier is an attribute which points towards respective page object, and wherein the code is representative of the unavailable method; and
repeating the step of identification and generation for each unavailable method.

* * * * *